(12) United States Patent
Kantt

(10) Patent No.: US 11,172,689 B2
(45) Date of Patent: Nov. 16, 2021

(54) SUGAR-REDUCED FOOD CREAM COMPOSITION USING NATIVE PEA STARCH

(71) Applicant: ROQUETTE FRERES, Lestrem (FR)

(72) Inventor: Carlos Kantt, North Aurora, IL (US)

(73) Assignee: ROQUETTE FRERES, Lestrem (FR)

( * ) Notice: Subject to any disclaimer, the term of this patent is extended or adjusted under 35 U.S.C. 154(b) by 95 days.

(21) Appl. No.: 16/561,125

(22) Filed: Sep. 5, 2019

(65) Prior Publication Data

US 2021/0068416 A1 Mar. 11, 2021

(51) Int. Cl.
| | |
|---|---|
| *A23G 3/48* | (2006.01) |
| *A23G 3/34* | (2006.01) |
| *A23L 11/00* | (2021.01) |
| *A21D 2/18* | (2006.01) |
| *A21D 13/062* | (2017.01) |

(52) U.S. Cl.
CPC ............. *A23G 3/343* (2013.01); *A21D 2/186* (2013.01); *A21D 13/062* (2013.01); *A23G 3/48* (2013.01); *A23L 11/05* (2016.08); *A23V 2002/00* (2013.01)

(58) Field of Classification Search
CPC ........... A23G 3/343; A23G 3/48; A23L 11/05; A21D 2/186; A21D 13/062; A23V 2002/00
USPC ........................................................ 426/653
See application file for complete search history.

(56) References Cited

U.S. PATENT DOCUMENTS

| | | | | |
|---|---|---|---|---|
| 4,360,535 A | * | 11/1982 | Darling | A23L 9/20 426/570 |
| 4,761,292 A | * | 8/1988 | Augustine | A23G 1/305 426/321 |
| 5,230,918 A | * | 7/1993 | Anderson | A23G 1/305 426/572 |
| 2015/0104556 A1 | * | 4/2015 | Kumar | A23C 13/125 426/565 |

* cited by examiner

*Primary Examiner* — Hamid R Badr

(57) ABSTRACT

The invention is related to a sugar-reduced food cream composition comprising fat, sugar and starch, wherein the starch is native starch having an average particle size between 20 μm and 30 μm, preferably between 22 μm and 28 μm, even more preferably between 23 μm and 26 μm, with a D90 smaller than 40 μm, preferably smaller than 36 μm. The invention also relates to a method of preparation of a sugar-reduced food cream composition comprising the steps of: selecting a recipe of a food cream composition comprising fat and sugar, replacing between 25% to 40%, preferably 25% to 35%, more preferably about 30% by weight of the total sugar content of said food cream composition by native starch having an average particle size between 20 μm and 30 μm, preferably between 22 μm and 28 μm, even more preferably between 23 μm and 26 μm, with a D90 smaller than 40 μm, preferably smaller than 36 μm.

44 Claims, No Drawings

SUGAR-REDUCED FOOD CREAM COMPOSITION USING NATIVE PEA STARCH

The present invention relates to a new food cream composition, more particularly a filling or a topping, having reduced sugar content, compared to a conventional food cream composition. The invention also relates to a method of preparation of such a composition.

State of the Art

Food cream compositions, such as fillings and toppings, are commonly used in confectionery and pastry to improve taste or visual qualities. However, they are an important source of sugar in food products in which they are used. Although the pleasure of sweetness is still present among consumers, many of them want to avoid the problems associated with the consumption of products with a high sugar content such as obesity, diabetes etc.

It is for this reason that the food industry has been led to develop formulations with reduced sugar content or even without sugar. Nevertheless the reduction of the sugar content in food products, while retaining suitable and customary organoleptic properties, and texture, is a major challenge for the food industry.

In addition to sweetness, sugar fulfils important technological functions such as volume contribution, mouthfeel, viscosity and storage, which must be taken into account when replacing it in food. One of the major difficulties that formulators of food compositions with reduced or no sugar content cannot avoid is therefore to successfully manufacture products that are similar to traditional products without having to modify or significantly complicate the installations and procedures already established in industries.

One way to replace the sweet taste of sugar is to use polyol, sometimes called sugar alcohol, for example applicant's maltitol SWEETPEARL®. The polyol provide volume and a sweet taste similar to sugar. This is called a bulk sweetener. The polyol are low in calories and have the additional advantage of being non-cariogenic. However, the incorporation of a significant amount of polyol in a food is not desirable because it causes digestive discomfort. For example, a food product containing more than 10% by weight of polyol must display on the packaging the following statement: "excessive consumption may have laxative effects". In addition, the cost of polyol is high.

Other bulk sweeteners provide volume but not a very sweet taste. This is the case for dietary fibers. Dietary fibers refer to those parts of plant origin that are not hydrolyzed by enzymes during digestion. These are residual substances from the cell wall or cytoplasm of plants, consisting of complex carbohydrate mixtures that have been identified as non-starch polysaccharides.

Among dietary fibers, a distinction is made between insoluble and water-soluble fibers. Oats, barley, fruit, fresh vegetables and dried vegetables (beans, lentils, chickpeas) are good sources of soluble fibers, while whole grains and wholegrain bread are rich in insoluble fibers. Insoluble fibers, such as cellulose, resistant starches, corn (distiller grain) or soybean fibers, have an essentially mechanical role in the gastrointestinal tract. They are only slightly fermented by the colic flora and contribute to the reduction of intestinal transit time by ballast effect. Insoluble fibers thus help to prevent constipation by increasing stool weight and reducing bowel movement time.

Soluble fibers, such as pectin and inulin, which are not digestible by human or animal intestinal enzymes, are fermented by the colic flora. This fermentation releases short-chain fatty acids into the colon, which have the effect of lowering the colon's pH and consequently limiting the development of pathogenic bacteria and stimulating the development of beneficial bacteria.

Glucose polymers are soluble fibers that are well tolerated by the body and are traditionally produced industrially by hydrolysis of natural or hybrid starches and their derivatives. These starch hydrolysates (dextrins, pyrodextrins, etc.) are thus produced by acid or enzymatic hydrolysis of cereal or tuber starch. They are in fact made up of a mixture of glucose and glucose polymers, of very different molecular weights. These hydrolysates have a wide distribution of saccharides containing both linear structures ($\alpha$ 1-4 osidic bonds) and connected ($\alpha$ 1-6 osidic connections).

Maltodextrins are an example of a glucose polymer frequently used in the food industry because they have a neutral taste that does not alter the product in which they are incorporated.

Applicant also described in its patent application EP 1 006 128 branched maltodextrins with between 22% and 35% 1-6 osidic bonds (both $\alpha$ and $\beta$), a reducing sugar content of less than 20%, a polymolecularity index of less than 5 and a number average molecular weight Mn of at most equal to 4500 g/mol. These branched maltodextrins, marketed by the applicant under the name of NUTRIOSE®, have above all an indigestibility character which has the effect of reducing their caloric value, by preventing their assimilation in the small intestine. They are therefore essentially a source of indigestible fibers.

WO 2013/128121 in the name of the Applicant describes hyperbranched maltodextrins of low molecular weight, i.e. with a dextrose equivalent (DE) of between 8 and 15 and a molecular weight Mw of between 1700 and 3000 Daltons, characterized by a content of 1-6 osidic bonds (both of the $\alpha$ and $\beta$ type) of between 30% and 45%, a soluble indigestible fiber content of between 75% and 100% (according to the method AOAC No. 2001-03) and remarkable hypoglycemic properties, in vitro as well as in situ, by a limiting effect on the digestion of standard maltodextrins.

In addition, products marketed under the names PROMITOR (Tate & Lyle), STA-LITE (Tate & Lyle), FIBERSOL (MATSUTANI), LITESSE (DUPONT DANISCO) are all products based on polysaccharides, which are more or less rich in fiber.

However, these products may have some disadvantages, particularly in terms of texture and appearance, when incorporated into food cream compositions, such as fillings or toppings, as a substitute for part of the sugar. The product obtained can be longer in the mouth, less melting, more elastic, drier compared to the reference product.

Applicant has surprisingly found that a native starch having an average particle size between 20 µm and 30 µm, with a D90 smaller than 40 µm overcomes at least part of these shortcomings. The use of this native starch enables the manufacture of food cream compositions with reduced sugar content using traditional processes, obtaining products with sensory qualities of appearance, taste and texture similar to those of a normal or standard food filling composition.

The present invention relates to a sugar-reduced food cream composition comprising fat, sugar and starch, wherein the starch is native starch having an average particle size between 20 µm and 30 µm, with a D90 smaller than 40 µm.

SUMMARY OF THE INVENTION

A first embodiment of the present invention is directed to a sugar-reduced food cream composition comprising fat, sugar and starch, wherein the starch is native starch having an average particle size between 20 μm and 30 μm, preferably between 22 μm and 28 μm, even more preferably between 23 μm and 26 μm, with a D90 smaller than 40 μm, preferably smaller than 36 μm.

A second embodiment is directed to a method of preparation of a sugar-reduced food cream composition comprising fat, sugar and starch comprising the step of:
  Selecting a recipe of a food cream composition comprising fat and sugar,
  Replacing between 25% to 40%, preferably between 25% to 35%, more preferably about 30%, of the total sugar content of said food cream composition by native starch having an average particle size between 20 μm and 30 μm, preferably between 22 and 28 μm, even more preferably between 23 and 26 μm, with a D90 smaller than 40 μm, preferably smaller than 36 μm.

DETAILED DESCRIPTION OF THE INVENTION

The food cream composition of the invention is a composition for use in food products. The term "food product" within the meaning of the invention preferably refers to a confectionery, pastry, biscuit or Viennese pastry product, in particular to cakes or biscuits.

The food cream composition of the invention may be intended to be:
  applied inside the food product or between two layers of food product, this is called a "filling" or "filling composition";
  applied to an outer surface, e.g. the top or the entire outer surface, of a food product, this is called a "topping" or "topping composition".

Thus, the food cream composition according to the invention can be used in the form of fillings, preferably so-called fat fillings, or in the form of toppings, preferably icings or frostings.

An example of products comprising a filling is biscuits in which a layer of filling is applied between two biscuits. These biscuits are commonly referred to as sandwich biscuits.

The expression "topping food composition" or "topping" according to the present invention includes in particular icings, frostings, ganaches, ice-cream pastes but also spreads. The food cream composition of the invention comprises 10% to 40%, preferably 15 to 30%, more preferably 20% to 25% by weight of native starch as defined herein based on the total weight of the food cream composition.

Filling compositions may include in particular comprises 10% to 40%, preferably 15% to 30%, more preferably 20% to 25% by weight of native starch as defined in this invention based on the total weight of the food filling composition.

In particular, the topping compositions may include 10% to 40%, preferably 15% to 30%, more preferably 20% to 25% by weight of native starch as defined in this invention based on the total weight of the food topping composition.

The native starch used in the cream food composition according to the invention has an average particle size between 20 μm and 30 μm, preferably between 22 μm and 28 μm, even more preferably between 23 μm and 26 μm, with a D90 smaller than 40 μm, preferably smaller than 36 μm.

An "average particle size" refers here to the D50 which means that 50% of the particles have size below the indicated value. For instance, an average particle size of 20 μm refers to a D50 of 20 μm, i.e. 50% of the particles have a particle size below 20 μm. The term D90 means that 90% of the particles have a particle size below the indicated value. For instance, a D90 of 40 μm means that 90% of the particles have a particle size below 40 μm. The average particle size as well as the D90 are determined by laser diffraction using the liquid route, e.g. on a BECKMAN-COULTER laser diffraction particle size analyzer LS 230, equipped with its small volume dispersion module (liquid route), following the technical manual and the manufacturer's instructions.

In an advantageous embodiment, the native starch has an amylose content between 20% and 45% by dry weight relative to the total dry weight of the starch. Preferably the amylose content is between 30% and 40% by dry weight relative to the total dry weight of the starch. Preferably, this starch is a native leguminous starch chosen from pea or faba bean starch.

Indeed, as sugar is a bulking agent having an important texture-generating role, replacing part or all of the sugar must necessarily be done by another bulking agent that can provide the same important texture-generating role. In addition to the challenge of reducing the sugar content while having a sweet taste, preserving the same texture in the mouth is not an easy task.

The inventors have found that this aim is achieved when using native starch having a small particle size, i.e. below than 30 μm, as defined above as partial sugar replacement. The use of a native leguminous starch, such as pea or faba bean starch, meets these requirements perfectly as they naturally present an average particle size between 20 μm and 30 μm, with a D90 smaller than 40 μm. Moreover their high amylose content of between 20% and 45%, preferably between 30% and 40%, by dry weight relative to the total dry weight of the starch is also appreciated.

The food cream composition according to the invention includes fat.

Fat refers to fats such as fats or oils contained in the food cream composition of the invention. The fat content is measured in relation to the weight of the food cream composition of the invention. Typically, said fat contains fatty acids selected from:
  saturated fatty acids;
  cis monounsaturated fatty acids;
  cis polyunsaturated fatty acids; and
  trans fatty acids.

Preferably, the fat used in the food cream composition according to the invention is fractionated, non-hydrogenated, refined oil free of lauric acid (dodecanoic acid). Such a fat can be found in trade under the reference Biscuitine® (Loders Cocklaan, Amsterdam) or palm kernel oil.

Alternatively, the fat used in the topping composition according to the invention contains lauric acid. Typically, this fat can be fractionated palm kernel oil. The fat used can also be cocoa butter.

The food cream composition according to the invention may include in particular 20% to 50%, preferably 30% to 45%, more preferably 35% to 40% by weight of fat relative to the total weight of the food cream composition.

Filling compositions according to the invention may include in particular 20% to 50%, preferably 30% to 45%, more preferably 35% to 40% by weight of fat relative to the total weight of the food filling composition.

Topping compositions according to the invention may include in particular 20 to 50%, preferably 30% to 45%, more preferably 35% to 40% by weight of fat relative to the total weight of the food topping composition.

The food cream composition according to the invention includes sugar. The term sugar within the meaning of the invention is to be interpreted broadly as designating a sweet-tasting carbohydrate. It includes in particular sucrose, dextrose, invert sugar (a mixture of glucose and fructose), lactose and mixtures thereof. Preferably, the sugar is chosen from sucrose, dextrose or lactose and mixtures thereof. Advantageously, the sugar is in powdered form.

According to an embodiment of the invention, the food cream composition comprises 20% to 50%, preferably 30% to 45%, more preferably 35% to 40% by weight of sugar relative to the total weight of the food cream composition. Thus, the food cream composition of the invention may be a reduced-sugar food cream composition, in particular reduced-sugar food filling composition or reduced-sugar food topping composition. In the context of the invention, the term "reduced-sugar" refers to food cream compositions that contain at least 25% by weight less sugar than the reference product. The reference product being a "normal" or "standard" food cream composition that does not contain starch in order to reduce the sugar content of the food product. The reduction of the sugar content of the food cream composition of the invention is achieved by replacing part of the sugar or all of the sugar, traditionally contained in the food cream composition with a native starch as defined herein.

Thus, in the present invention, the reduction of the sugar content of the food cream composition is not or not entirely due to a replacement of part of the sugar traditionally contained in a food cream composition with a polyol.

Indeed, it is known that replacing some of the sugar (added sugar) with a polyol reduces the sugar content in a food cream composition while maintaining the sweet taste of the finished product. However, the incorporation of a significant amount of polyol in the food cream composition is not desirable because it causes digestive discomfort. For example, a food product containing more than 10% by weight of polyol must display on the packaging the following statement: "excessive consumption may have laxative effects". In addition, the cost of polyol is high. Thus, the food cream composition of the present invention contains less than 10%, preferably less than 5%, more preferably less than 1% by weight of polyol relative to the total weight of the food cream composition. Preferably, the food cream composition of this invention does not contain any polyol. For the purposes of this invention, the term "polyol" means a polyol sweetener such as xylitol, sorbitol, mannitol, isomalt, maltitol, erythritol, lactitol, iditol, arabitol and mixtures thereof.

Additionally, in the present invention, the reduction of the sugar content of the food cream composition is not or not entirely due to a replacement of part of the sugar traditionally contained in a food cream composition, by dietary fibers. These dietary fibers have not a very sweet taste. Among dietary fibers, a distinction is made between insoluble and water-soluble fibers. Oats, barley, fruit, fresh vegetables and dried vegetables (beans, lentils, chickpeas) are good sources of soluble fibers, while whole grains and wholegrain bread are rich in insoluble fibers. Soluble fibers, such as pectin and inulin, which are not digestible by human or animal intestinal enzymes, are fermented by the colic flora. Glucose polymers are soluble fibers that are traditionally produced industrially by hydrolysis of natural or hybrid starches and their derivatives. These starch hydrolysates (dextrins, pyrodextrins, etc.) are thus produced by acid or enzymatic hydrolysis of cereal or tuber starch. They are in fact made up of a mixture of glucose and glucose polymers, of very different molecular weights. These hydrolysates have a wide distribution of saccharides containing both linear structures ($\alpha$ 1-4 osidic bonds) and connected ($\alpha$ 1-6 osidic connections).

It is known that branched maltodextrins, such as the ones marketed by the applicant under the name of NUTRIOSE®, have above all an indigestibility character which has the effect of reducing their caloric value, by preventing their assimilation in the small intestine; they are therefore essentially a source of indigestible fibers.

Thus, the food cream composition of the present invention preferably contains less than 10%, preferably less than 5%, more preferably less than 1% by weight of dietary fibers relative to the total weight of the food cream composition. Preferably, the food cream composition of this invention does not contain any dietary fibers.

The food cream composition according to the invention may also include an emulsifier. A non-exhaustive list of emulsifiers includes lecithin, polyoxyethylene sorbitan monolaurate, polyoxyethylene sorbitan monooleate, polyoxyethylene sorbitan monopalmitate, polyoxyethylene sorbitan monostearate, polyoxyethylene sorbitan tristearate, fatty acid mono- and diglycerides, acetic acid esters and glycerol fatty acids, esters of lactic acids and glycerol fatty acids, esters of citric acids and glycerol fatty acids, esters of sucrose of fatty acids, polyglycerol esters of fatty acids, sorbitan monostearate, sorbitan tristearate, sorbitan monolaurate, sorbitan monooleate or sorbitan monopalmitate as well as their mixtures. Preferably, said emulsifier is lecithin, more preferably soybean lecithin.

The emulsifier may be present in an amount of 0.1% to 1%, preferably 0.25% to 0.85%, more preferably 0.40% to 0.65% by weight of emulsifier relative to the total weight of the food cream composition.

The food cream composition according to the invention may also include a flavor. A non-exclusive list of flavors includes dark chocolate, milk chocolate, white chocolate, hazelnut, coconut, vanilla, caramel, coffee, speculos, salted caramel, praline, pistachio or their mixtures. The flavor may be present in an amount of 0.05% to 1%, preferably 0.07% to 0.3%, more preferably 0.1% to 0.15% by weight of flavor relative to the total weight of the food cream composition.

In one embodiment the food cream composition is a filling composition comprising:
  10% to 40%, preferably 15% to 30%, more preferably 20% to 25% of a native starch having an average particle size between 20 µm and 30 µm, with a D90 smaller than 40 µm;
  20% to 50%, preferably 30% to 45%, more preferably 35% to 40% by weight of sugar;
  20% to 50%, preferably 30% to 45%, more preferably 35% to 40% by weight of fat;
  0.05% a 1%, preferably 0.07% to 0.3%, more preferably 0.1% to 0.15% by weight of flavor; and
  0.1% a 1%, preferably 0.25% to 0.85%, more preferably 0.40% to 0.65% by weight of an emulsifier,
the percentages by weight being expressed relative to the total weight of the food cream composition.

The sugar-reduced food cream composition comprising fat, sugar and starch of the invention can be obtained with a method of preparation comprising the steps of:

Selecting a recipe of a food cream composition comprising fat, and sugar,
Replacing between 25% to 40%, preferably between 25% to 35%, more preferably about 30%, of the total sugar content of said food cream composition by native starch having an average particle size between 20 μm and 30 μm, preferably between 22 μm and 28 μm, even more preferably between 23 μm and 26 μm, with a D90 smaller than 40 μm, preferably smaller than 36 μm.

In an advantageous embodiment, the native starch has an amylose content between 20% and 45% by dry weight relative to the total dry weight of the starch. Preferably the amylose content is between 30% and 40% by dry weight relative to the total dry weight of the starch. Preferably, this starch is a native leguminous starch chosen from pea or faba bean starch.

Advantages of the invention:

The use of native starch allows reducing the sugar content of food cream compositions, such as fillings and toppings, while maintaining its sensory and organoleptic properties, especially its creamy texture, low gritty mouthfeel and low intensity of off-flavor notes. Typically, these parameters can be measured by sensory analysis. Sensory analysis means a technique for objectively qualifying the organoleptic properties of a product. This is a description of this product, using a set of standardized descriptors, by a group of people trained to quantify these descriptors on an evaluation scale.

The invention will be better understood by reading the following examples which are intended to be illustrative and not exhaustive.

EXAMPLES

Particle size profiles of different starch as used in the Examples:

|  | Particle size Average (μm) | D90 (μm) |
|---|---|---|
| Native corn starch (ARGO) | 14.6 | 21.6 |
| Pregelatinized starch (PREGEFLO ® C100, Roquette Frères) | 110 | 260 |
| Maize Dextrin (NUTRIOSE ® FM 06, Roquette Frères) | 250 | 350 |
| Native pea starch N-735 (PEA STARCH N-735, Roquette Frères) | 23.7 | 34.8 |
| Native faba bean starch | 25 | 35 |

Example 1

Preparation of Food Cream Compositions Comprising Native Corn Starch, PREGEFLO C100, NUTRIOSE® FM06 or Native Pea Starch Food cream compositions are prepared using the formulas detailed in table 1 below (quantities are given in grams).

Composition 1 corresponds to a control food cream composition.

Compositions 2, 3, 4 and 5 correspond to compositions in which a part of powdered sugar from the control recipe is substituted respectively by
native corn starch (ARGO),
pregelatinized corn starch PREGEFLO C100 (Roquette Frères).
NUTRIOSE® FM 06 (Roquette Frères),
native pea starch N735 (Roquette Frères)

Composition 5 is a composition according to the invention.

TABLE 1

| Components (g) | Composition 1 | Composition 2 | Composition 3 | Composition 4 | Composition 5 |
|---|---|---|---|---|---|
| Powdered Sugar | 270.5 | 172.8 | 172.8 | 172.8 | 172.8 |
| Biscuitine 500 Vegetable fat | 175.5 | 177.0 | 177.0 | 177.0 | 177.0 |
| Vanilla extract flavor | 0.5 | 0.5 | 0.5 | 0.5 | 0.5 |
| Soy lecithin | 2.5 | 2.5 | 2.5 | 2.5 | 2.5 |
| Native corn starch | 0 | 97.5 | 0 | 0 | 0 |
| PREGEFLO ® C100 | 0 | 0 | 97.5 | 0 | 0 |
| NUTRIOSE ® FM06 | 0 | 0 | 0 | 97.5 | 0 |
| Native Pea starch N-735 | 0 | 0 | 0 | 0 | 97.5 |
| total | 449 | 450.3 | 450.3 | 450.3 | 450.3 |

The method of preparation of the food cream compositions is as follows:
In a mixer bowl weigh, mix Biscuitine 500 Vegetable fat, soy lecithin and vanilla extract flavor.
In a Hobart mixer with a wire whisk, mix powdered sugar with the starch and add the precedent mixture at low speed until a homogeneous mixture is obtained.
Mix at high speed for 1 minute.
Scrape sides of bowl.
Mix for an additional 4 minutes.

Example 2

Sensory Analysis of Food Cream Compositions of Example 1

A group of 6 panelists tested the sensory properties of compositions 1, 2, 3, 4 and 5 in Example 1 using the following descriptors:
Average grittiness, from creamy to clumpy;
Average creaminess, from low to high; and
Average off-flavor, plain sweet to high off-flavor.

The panelists had a scale from 1 to 9, with 1 being low and 9 being high, and they gave each composition a rating after tasting. The results were then averaged.

The results are summarized in the table 2 below.

TABLE 2

|  | Average grittiness | Average creaminess | Average off-flavor |
|---|---|---|---|
| Composition 1 | 4.8 | 3.8 | 1.7 |
| Composition 2 | 5.2 | 2.8 | 4.8 |
| Composition 3 | 3.5 | 3.8 | 6.0 |
| Composition 4 | N/A | N/A | N/A |
| Composition 5 | 3.3 | 2.0 | 3.3 |

*N/A: not applicable

The results show that:
Composition 1 with only powdered sugar was slightly gritty, creamy and with a very low off-flavor note.

The sensory profile of composition 2, even with an average particle size smaller than that of pea starch, is less efficient. A high gritty mouthfeel and off-flavor notes were detected by the panel which is not acceptable. Indeed, an average off-flavor around 3-4 on a scale of 9 is considered as acceptable, but higher than 3-4, the off-flavor is too pronounced to be acceptable. Indeed the off-flavor is such that it makes the food cream composition not appreciated by consumers. Therefore using native corn starch for a partial sugar replacement is not a suitable alternative.

Composition 3 had the same creaminess as the control, a lower gritty mouthfeel, but a high off-flavor. Therefore using PREGEFLO for partial sugar replacement is not a suitable alternative.

Composition 4 is extremely gritty due to the high particle size of NUTRIOSE® FM 06. The grittiness was that important that the composition was not even tested by the panelists. In order to be able to use NUTRIOSE® FM 06 as partial sugar replacement, it would be necessary to reduce its particle size prior to using it. In conclusion, NUTRIOSE® FM 06 is not a suitable candidate for partial sugar replacement either.

Composition 5, which is the composition according to the invention, shows:
- a good creamy texture in the mouth or even better than the control composition because it is smoother;
- low gritty mouthfeel, even better than the control composition;
- off-flavor notes that are acceptable.

Therefore, the inventors have demonstrated that the particle size profile of the starch used in the food cream composition has a significant impact on sensory and organoleptic properties. Indeed, the inventors have found that a too low average particle size, such as in composition 2, has a negative impact especially on grittiness which is surprising. The inventors believe that if the particle size is too small, the starch particles will agglomerate together to form larger agglomerates that will become perceptible in the mouth.

In the same way, if the average particle size is too high, such as in composition 4, the resulting food cream composition also has a gritty mouthfeel, which can only be avoided if a so-called refiner is used to prepare the composition.

Thus, the inventors have demonstrated that the substitution of sugar by native pea starch makes it possible to maintain the sensory and organoleptic properties of the product, or even to improve them without having to modify or significantly complicate the installations and procedures already established in the industry compared to the other compositions.

The food cream composition according to the invention are thus good low sugar substitutes for traditional food cream compositions, such as fillings and toppings, in particular cream fillings for sandwich biscuits.

The invention claimed is:

1. A sugar-reduced food cream composition comprising fat, sugar and starch, wherein the starch is native starch having an average particle size between 20 µm and 30 µm, with a D90 smaller than 40 µm.

2. The sugar-reduced food cream composition of claim 1, wherein the native starch has an amylose content between 20% and 45% by dry weight.

3. The sugar-reduced food cream composition of claim 1, wherein the native starch is a native leguminous starch.

4. The sugar-reduced food cream composition of claim 1, wherein the native starch is pea or faba bean starch.

5. The sugar-reduced food cream composition of claim 1, comprising 10% to 40% by weight of native starch, the native starch having an average particle size between 20 µm and 30 µm, with a D90 smaller than 40 µm.

6. The sugar-reduced food cream composition of claim 1, comprising 20% to 50% by weight of fat.

7. The sugar-reduced food cream composition of claim 1, comprising 20% to 50% by weight of sugar.

8. The sugar-reduced food cream composition of claim 1, comprising 0.05% to 1% by weight of flavor.

9. The sugar-reduced food cream composition of claim 1, comprising 0.1% to 1% by weight of an emulsifier.

10. The sugar-reduced food cream composition of claim 1, wherein the sugar-reduced food cream is selected from the group consisting of topping or filling compositions.

11. The sugar-reduced food cream composition of claim 1, wherein said food cream composition is a filling composition comprising:
    10% to 40% of a native starch having an average particle size between 20 µm and 30 µm, with a D90 smaller than 40 µm;
    20% to 50% by weight of sugar;
    20% to 50% by weight of fat;
    0.05% to 1% by weight of flavor; and
    0.1% to 1% by weight of an emulsifier.

12. A method of preparation of a sugar-reduced food cream composition comprising fat, sugar and starch, wherein said method comprises the steps of:
    selecting a recipe of a food cream composition comprising fat and sugar,
    replacing between 25% to 40% by weight of the total sugar content of said food cream composition by native starch having an average particle size between 20 µm and 30 µm, with a D90 smaller than 40 µm.

13. The method of claim 12, wherein the native starch has an amylose content between 20% and 45% by dry weight.

14. The method of claim 12, wherein the native starch is a native leguminous starch.

15. The method of claim 12, wherein the native starch is pea starch or faba bean starch.

16. The sugar-reduced food cream composition of claim 1, wherein the starch is native starch having an average particle size between 22 µm and 28 µm, with a D90 smaller than 36 µm.

17. The sugar-reduced food cream composition of claim 1, wherein the starch is native starch having an average particle size between 23 µm and 26 µm.

18. The sugar-reduced food cream composition of claim 2, wherein the native starch has an amylose content between 30% and 40% by dry weight.

19. The sugar-reduced food cream composition of claim 5, comprising 15 to 30% by weight of native starch.

20. The sugar-reduced food cream composition of claim 5, comprising 20% to 25% by weight of native starch.

21. The sugar-reduced food cream composition of claim 5, wherein the native starch has an average particle size between 22 µm and 28 µm.

22. The sugar-reduced food cream composition of claim 5, wherein the native starch has an average particle size between 23 µm and 26 µm.

23. The sugar-reduced food cream composition of claim 5, wherein the native starch has a D90 smaller than 36 µm.

24. The sugar-reduced food cream composition of claim 6, comprising 30% to 45% by weight of fat.

25. The sugar-reduced food cream composition of claim 6, comprising 35 to 40% by weight of fat.

26. The sugar-reduced food cream composition of claim 7, comprising 30% to 45% by weight of sugar.

27. The sugar-reduced food cream composition of claim 7, comprising 35% to 40% by weight of sugar.

28. The sugar-reduced food cream composition of claim 8, further comprising 0.07% to 0.3% by weight of flavor.

29. The sugar-reduced food cream composition of claim 8, further comprising 0.1% to 0.15% by weight of flavor.

30. The sugar-reduced food cream composition of claim 9, further comprising 0.25% to 0.85% by weight of an emulsifier.

31. The sugar-reduced food cream composition of claim 9, further comprising 0.40% to 0.65% by weight of an emulsifier.

32. The sugar-reduced food cream composition of claim 11, comprising 15% to 30% of a native starch having an average particle size between 22 µm and 28 µm with a D90 smaller than 36 µm.

33. The sugar-reduced food cream composition of claim 11, comprising 20% to 25% of a native starch having an average particle size between 23 µm and 26 µm with a D90 smaller than 36 µm.

34. The sugar-reduced food cream composition of claim 11, comprising 30% to 45% by weight of sugar.

35. The sugar-reduced food cream composition of claim 11, comprising 35% to 40% by weight of sugar.

36. The sugar-reduced food cream composition of claim 11, comprising 30% to 45% by weight of fat.

37. The sugar-reduced food cream composition of claim 11, comprising 35% to 40% by weight of fat.

38. The sugar-reduced food cream composition of claim 11, comprising 0.07% to 0.3% by weight of flavor.

39. The sugar-reduced food cream composition of claim 11, comprising 0.1% to 0.15% by weight of flavor.

40. The sugar-reduced food cream composition of claim 11, comprising 0.25% to 0.85% by weight of an emulsifier.

41. The sugar-reduced food cream composition of claim 11, comprising 0.40% to 0.65% by weight of an emulsifier.

42. The method of preparation of a sugar-reduced food cream composition of claim 12, wherein between 25% to 35% by weight of the total sugar content of said food cream composition are replaced by native starch having an average particle size between 22 and 28 µm with a D90 smaller than 36 µm.

43. The method of preparation of a sugar-reduced food cream composition of claim 12, wherein 30% by weight of the total sugar content of said food cream composition are replaced by native starch having an average particle size between 23 and 26 µm with a D90 smaller than 36 µm.

44. The method of claim 13, wherein the native starch has an amylose content between 30% and 40% by dry weight.

\* \* \* \* \*